United States Patent

[11] 3,618,982

| [72] | Inventor | John A. Moore<br>Peoria, Ill. |
| --- | --- | --- |
| [21] | Appl. No. | 843,099 |
| [22] | Filed | July 18, 1969 |
| [45] | Patented | Nov. 9, 1971 |
| [73] | Assignee | Caterpillar Tractor Co.<br>Peoria, Ill. |

[54] DRAWBAR FOR ARTICULATED VEHICLE
3 Claims, 4 Drawing Figs.

[52] U.S. Cl. .................................................. 280/408,
280/446, 280/459
[51] Int. Cl. .................................................. B60d 7/00
[50] Field of Search .......................................... 280/442,
443, 444, 445, 446, 492, 493, 456, 459, 461, 408,
410

[56] References Cited
UNITED STATES PATENTS
2,219,585  10/1940  Begin ............................ 280/408 X

| 3,414,072 | 12/1968 | Hodges, Jr. et al. ........... | 180/51 |
| --- | --- | --- | --- |
| FOREIGN PATENTS | | | |
| 2,444 | 9/1862 | Great Britain ................ | 280/461 |
| 428,046 | 4/1935 | Great Britain ................ | 280/442 |
| 208,678 | 4/1909 | Germany ...................... | 280/410 |
| 173,580 | 11/1934 | Switzerland .................. | 280/446 |

*Primary Examiner*—Benjamin Hersh
*Assistant Examiner*—John P. Silverstrim
*Attorney*—Fryer, Tjensvold, Feix, Phillips & Lempio ABSTRACT: A drawbar mechanism for a vehicle made of two sections articulately connected as by a vertical pivot pin and which vehicle is steered by angling the two sections with relation to each other about the pin. The drawbar is pivoted for swinging movement behind the rear of the rearmost section and there is a connection between the forward section and the drawbar to cause the drawbar to swing in a direction opposite to that in which the vehicle is steered, thus reducing the magnitude of movement of the drawbar away from the direction of travel of the vehicle.

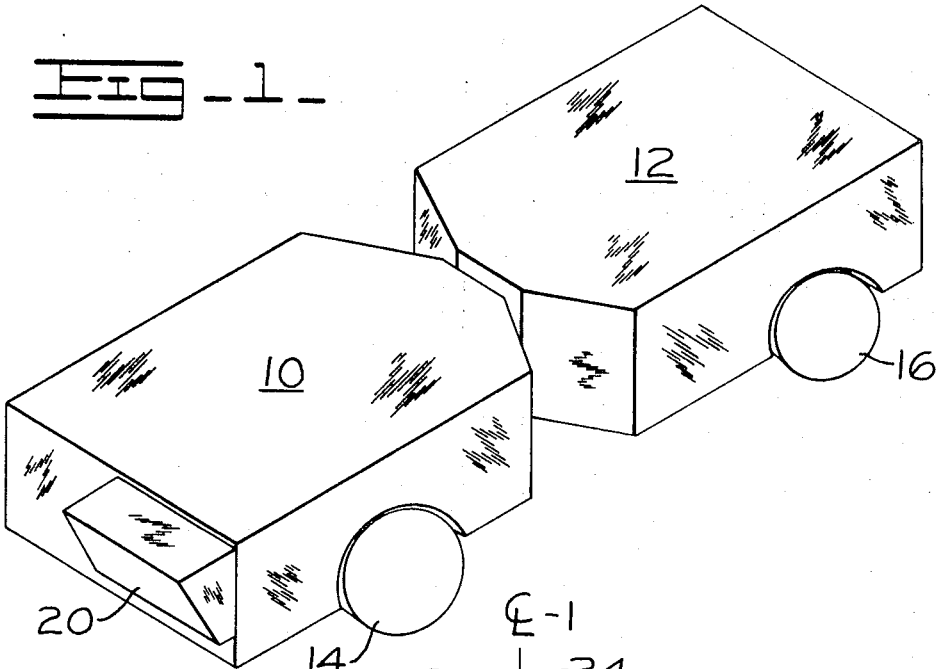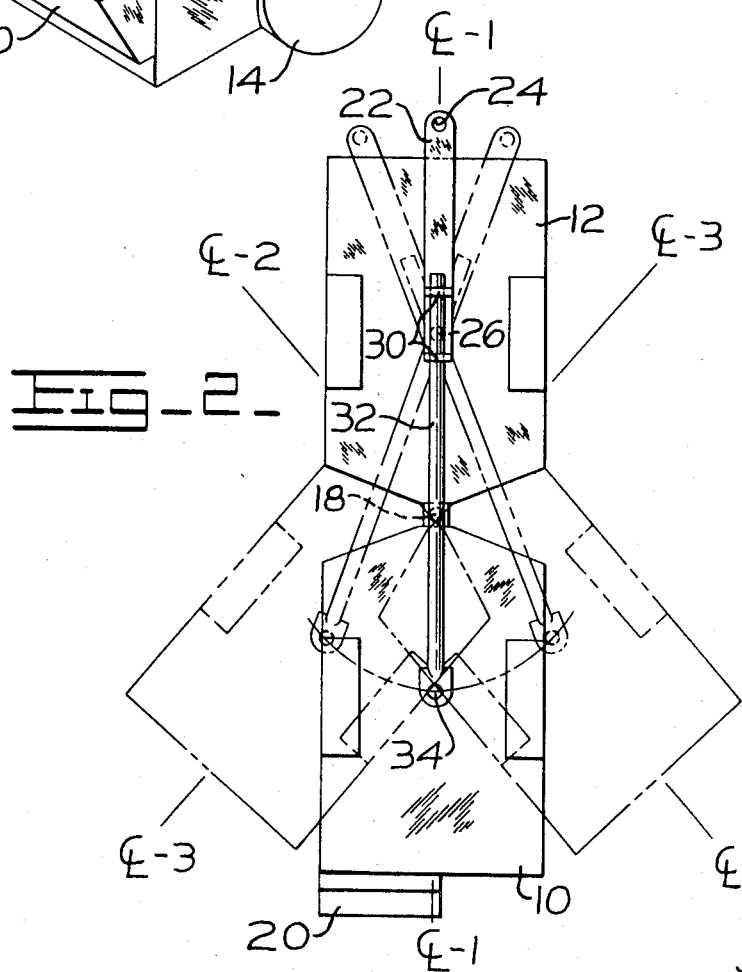

DRAWBAR FOR ARTICULATED VEHICLE

A vehicle has been designed for the particular purpose of towing large aircraft between different positions at an airport. The vehicle is steered by articulation of its pivoted sections and has a low overall profile to enable it to be maneuvered under the wings of the aircraft. Since frequent radical turns are necessitated by confined or limited spaces at airports, it was found that the usual fixed drawbar presented the disadvantage of having a wide range of oscillation during turning of the vehicle. The present invention overcomes this disadvantage by pivoting the drawbar to the rear section of the vehicle and providing linkage which connects it to the forward section in such a manner that steering of the vehicle by angling the sections with respect to each other causes swinging movement of the drawbar in a direction to reduce its necessary range of oscillation when the direction of vehicle travel is changed.

The invention will be more fully understood upon reading the following specification wherein reference is made to the accompanying drawings.

In the drawings:

FIG. 1 is a schematic view in perspective of an articulated vehicle of the type in which the present invention is used;

FIG. 2 is a schematic view of the same vehicle in bottom plan illustrating the straight ahead as well as the right-turn and the left-turn positions of the vehicle sections and showing the drawbar mechanism of the present invention;

FIG. 1 schematically illustrates a vehicle having a forward section 10 and a rearward section 12 having wheels, one for each section being shown at 14 and 16 respectively. The two sections are pivotally connected as by a vertical pin shown at 18 in FIG. 2 and a driver's cab is disposed forwardly of the front section as represented in FIG. 1 at 20. The vehicle is steered by angling the sections 10 and 12 about the connecting pivot pin 18 and this is generally accomplished by one or more jacks disposed between the vehicles on one or both sides of the pin 18. This is a well-known type of steering employed in many articulated vehicles and is not disclosed herein since it has no bearing on the present invention.

Figure 3:
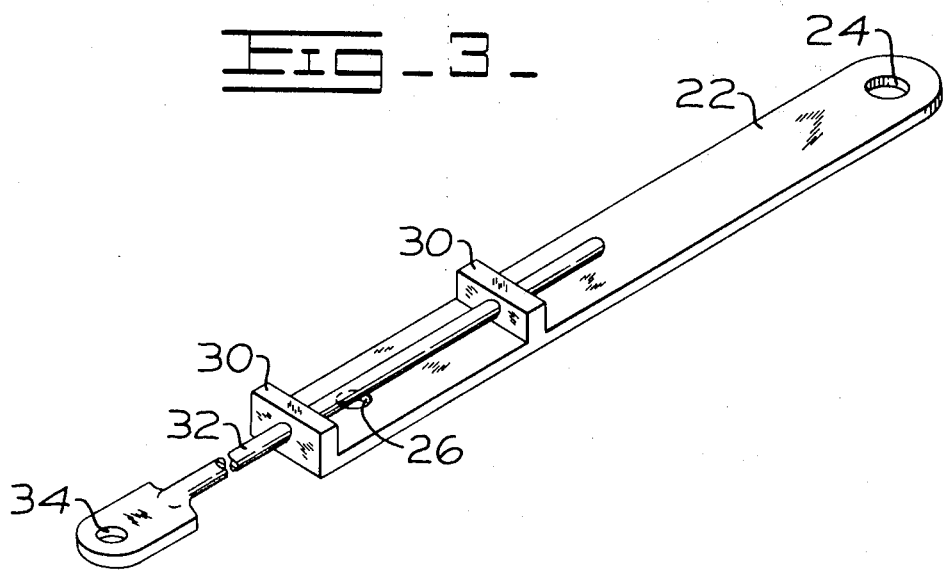
FIG. 3 is a perspective detail of portions of the drawbar shown in FIG. 2.

In FIG. 2, which is a view looking upwardly at the bottom of the vehicle, the rear section 12 is illustrated as having a drawbar 22 with a hole for the reception of a drawbar pin at 24, and a pivotable connection at 26 with the rear section of the vehicle approximately midway of its length. The drawbar has a pair of spaced perforated guide lugs 30 (See also FIG. 3) and a long bar 32 extends through these guide lugs and is pivotally connected as at 34 to the central area of the bottom of the forward section 10. This is also represented in FIG. 3. By reason of this linkage, the drawbar 22, instead of remaining in its central position in the manner of a conventional fixed drawbar will swing from side to side during turning movement of the tractor. For example, as viewed in FIG. 2, when the forward tractor section 10 is swung toward the right, the long bar 32 will impart swinging movement to the drawbar about its pivot 26 toward the left and to the broken line position shown. Similarly, when the section 10 swings toward the left as viewed in FIG. 2, the drawbar 22 swings toward the right.

Assuming now that the drawbar 22 is a centrally disposed fixed drawbar which does not swing during steering of the tractor, it would be caused to diverge through a wide arc with respect to the center line of the tractor during steering. For example, FIG. 2 shows the sections 10 and 12 in full lines on a center line CL-1. When a full turn is made by swinging section 10 to the position shown at CL-2, the fixed drawbar would be caused to travel from the position shown on center line CL-1 to the new direction of travel CL-2. The effect of the linkage which connects the new drawbar with the forward section of the tractor is to swing the drawbar toward the new direction of travel and reduce the angle of its divergence from the new position.

Figure 4:
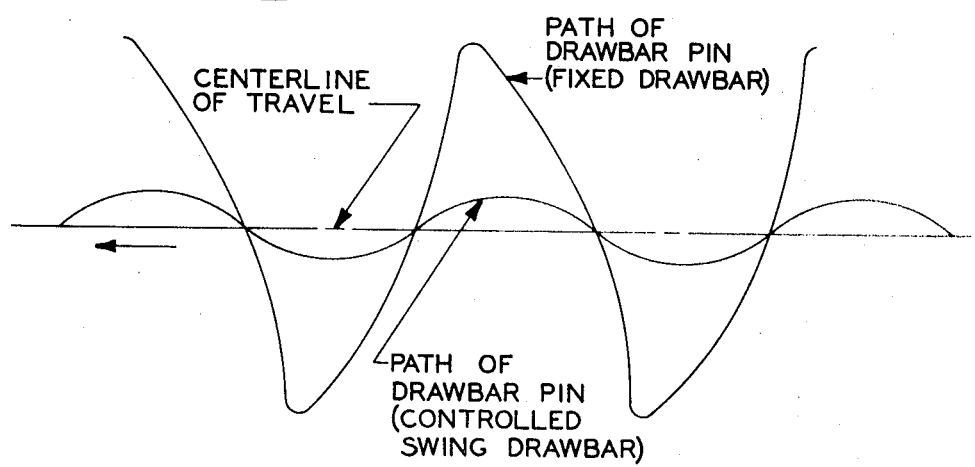
FIG. 4 is a chart or trace illustrating the path of travel of a drawbar pin both with and without the present invention.

FIG. 4 illustrates the path of travel of the drawbar pin, or center of the hole 24, shown in FIG. 2 when the drawbar is fixed, as compared to a drawbar the swing of which is controlled by the linkage of the present invention. It is apparent that the swing of the drawbar in the direction opposite to the steering of the forward tractor section away from the center line of travel reduces unnecessary oscillation of the connection between the tractor and unit which it is pulling and increases the smoothness and efficiency of the towing operation.

What is claimed is:

1. In an articulated towing vehicle having a front section means and a rear section means which section means are pivotally connected together for steering, a towing drawbar means pivotally connected to said rear section means intermediate front and rear ends thereof said towing drawbar means extending axially beyond said rear end of said rear section means and capable of swinging movement about its pivot connection to said rear section means, and separate means movable with respect to said drawbar means and pivoted to said front section means and operable when said front section means is turning in one direction to coact with said drawbar means and to cause said drawbar means to swing in an opposite direction about its pivot connection.

2. The drawbar system of claim 5 in which the separate means comprises a rigid bar member pivoted to said front section means and engaging the drawbar means of said rear section means.

3. The drawbar system of claim 2 in which said rigid bar member pivoted to said front section means has a slidable connection with said drawbar means of said rear section means to maintain longitudinal alignment therewith.

* * * * *

PO-1050
(5/69)

UNITED STATES PATENT OFFICE
CERTIFICATE OF CORRECTION

Patent No. 3,618,982            Dated November 9, 1971

Inventor(s) JOHN A. MOORE

It is certified that error appears in the above-identified patent and that said Letters Patent are hereby corrected as shown below:

In column 2, line 45, "5" should read --1--.

Signed and sealed this 25th day of April 1972.

(SEAL)
Attest:

EDWARD M. FLETCHER, JR.            ROBERT GOTTSCHALK
Attesting Officer                   Commissioner of Patents